COIN TELEPHONE SECURITY DEVICES

Filed Jan. 24, 1962

2 Sheets-Sheet 1

INVENTOR.
HULAND R. SAMPLES
BY Patrick F. Henry
ATTORNEY

INVENTOR.
HULAND R. SAMPLES
BY Patrick J. Henry
ATTORNEY 3,213,210
COIN TELEPHONE SECURITY DEVICES
Huland R. Samples, 906 Adamson St. SW., Atlanta 15, Ga.
Filed Jan. 24, 1962, Ser. No. 168,339
11 Claims. (Cl. 179—189)

This invention relates to a coin telephone security device and especially to apparatus of that sort for mounting a coin telephone in a public booth or other places in such a manner substantially to prevent or significantly reduce the pilfering or tampering with the telephone in an effort to obtain the coins therein.

Most coin telephones are located in public places and some of them are located in unwatched and unguarded places especially during the late evening hours and the early morning hours. As a result the telephone companies throughout the country have had a considerable amount of pilferage from coin telephones. Some of the pilferage cases took place at public booths located near streets and highways and the thieves used a heavy screwdriver or pinch bar to tear the entire telephone from the booth. The loss of money is comparatively small compared with the expensive damage done both to the telephone booth and to the telephone equipment. Apparently many thieves use wrecking bars or heavy screwdrivers and jump hurriedly from automobiles into these booths and in one swift action they insert the implement between the telephone and the booth or into the telephone case and with one sudden effort tear the entire apparatus away. There is an extreme need for a better mounting arrangement for the coin telephone and the present invention has been found adequately to serve that purpose while still allowing the normal function of the telephone and all of the services incident thereto such as repair and collection of the coins by the telephone company.

Generally described, without regard to the scope of invention as contained in the appended claims, the device comprises essentially three parts plus the wall or the like which normally forms a permanent part of the telephone booth structure. The three parts are the back member or mounting or attaching plate which is attached to the booth plate by suitable screws, a closure plate which fits into a portion of the back member or mounting plate, and a member which matches with the other two parts and receives a conventional tumbler lock or the like to affix the parts in place with the coin telephone confined therein. Provision is made in the arrangement for the release of coins in the usual manner and an exposed keyhole is provided through which access may be obtained to unlock and disassemble the device by telephone employees. Preferably the wall or the like of the booth structure is pre-drilled and pre-formed with the necessary holes and tapped openings to receive the bolts of the assembly whereby the mounting of the telephone in the booth is a simple expedient. Likewise, the mounting member or plate of the security apparatus contains parts which match with the other parts of the security apparatus for quick assembly and disassembly and is pre-formed with the necessary tapped openings and the like to simplify the installation.

An object of this invention is to provide a telephone security device which is used in mounting a coin telephone to a booth or the like in such a manner as substantially to prevent the normal tearing of the telephone equipment form the booth or the surreptitious removal of the coin compartment.

Another object of this invention resides in the comparative simplicity of the mounting arrangement which allows the telephone company to install the equipment and remove same without significantly any more work or trouble than existed with previous unsecure arrangments.

Still another object of the present invention resides in the construction of the telephone security mounting apparatus whereby the coins may be collected readily by the telephone company having keys thereto but where it is very difficult for a thief to break into the telephone or to remove the phone from its wall except with special equipment and sufficient time.

Other and further objects and advantages of my invention will become apparent upon reading the following specification taken in conjunction with accompanying drawings wherein.

Figures 1, 2:
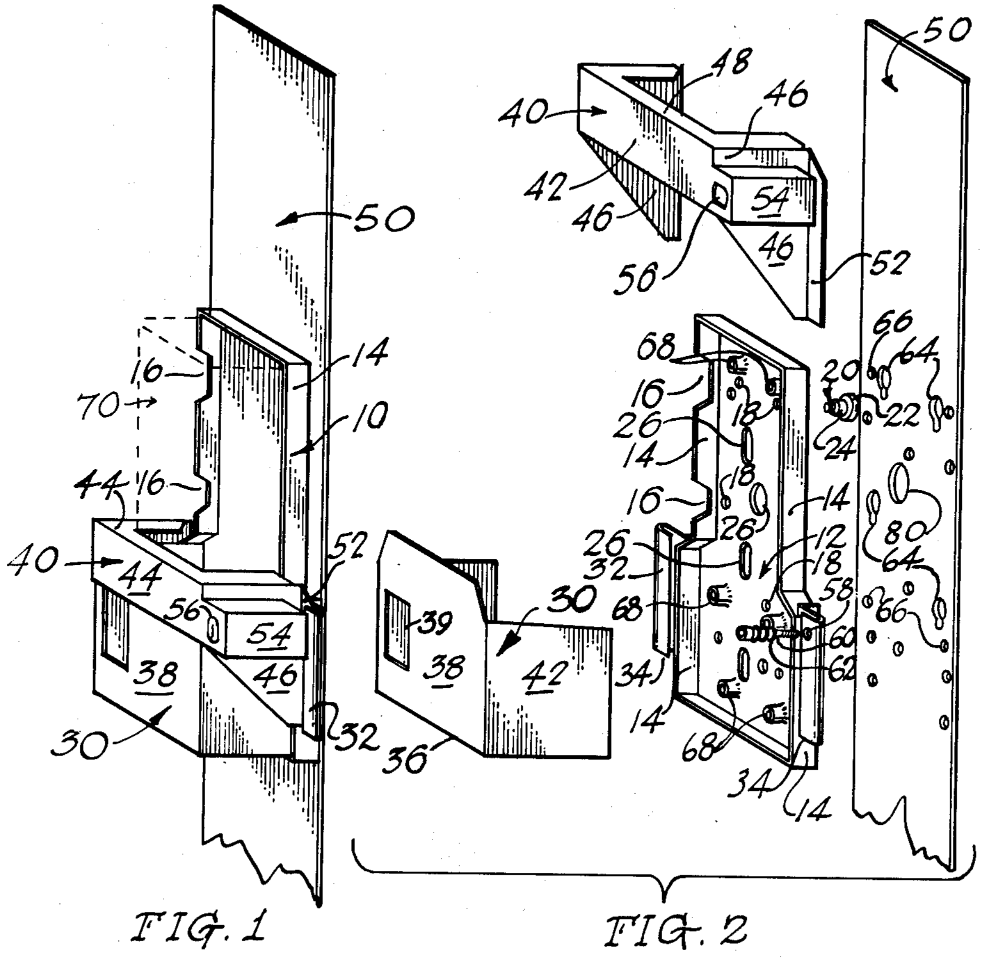
FIG. 1 is a perspective view of the telephone security device embodiment of the present invention in assembled relation with the conventional coin telephone shown by overall dotted lines.
FIG. 2 is a disassembled and exploded view of the three major parts of the telephone security device with the coin telephone omitted.
Figures 3, 4:
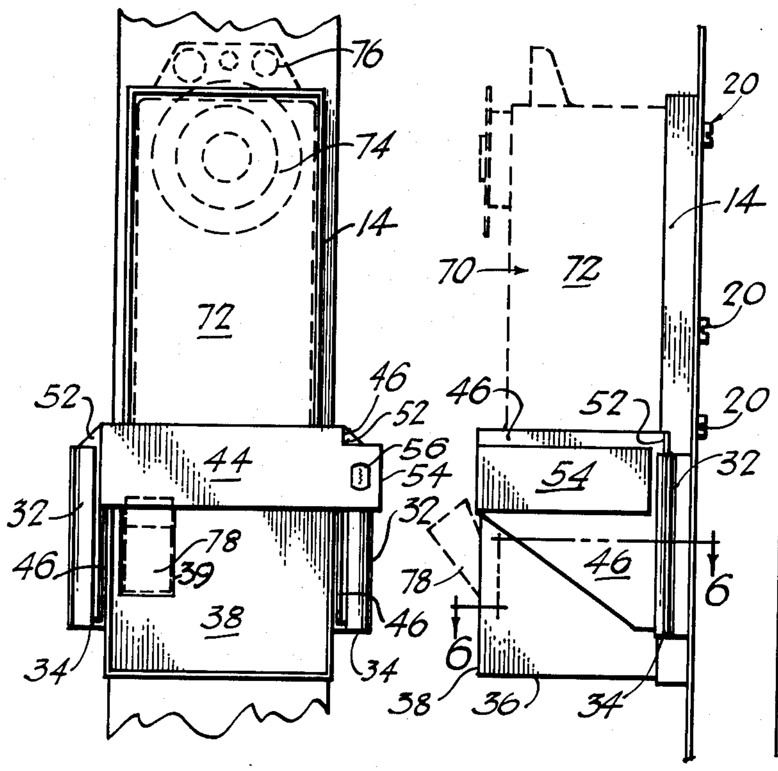
FIG. 3 is a front elevation view of the assembled embodiment shown in FIG. 1 with the coin telephone in dotted lines.
FIG. 4 is a side elevation view of the embodiment shown in FIG. 3.
Figure 5:
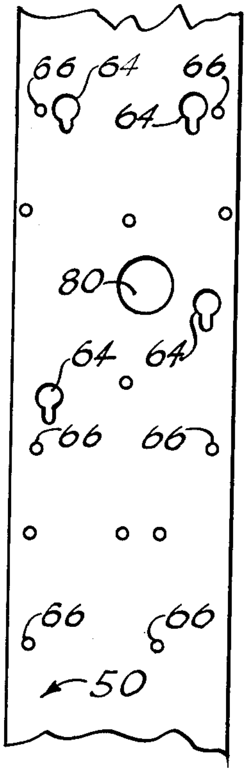
FIG. 5 is a rear elevation view of the wall or other plate or surface which normally forms a permanent part of the booth or compartment cover in which the coin telephone is mounted.
Figure 6:
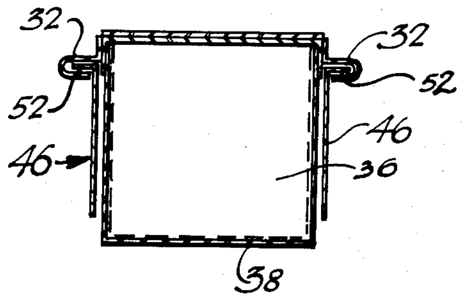
FIG. 6 is a cross-sectional view taken substantially along lines 6—6 in FIG. 4.

Referring initially to FIGS. 1 and 2 of the drawings and thence to other figures of the drawings as the details are developed, the overall security device is designated generally by reference numeral 10 and comprises three primary parts, the member or mounting plate 12, the cover box member 30, and the lock or fastening bracket or member 40. Associated with the three major parts of the security device and actually forming a part thereof is the wall or other plate or surface 50 which normally forms a permanent part of the telephone booth or the covered compartment which holds the coin telephone.

It is to be understood throughout the specification that while reference is made from time to time to the telephone or the coin telephone no modification or alteration has been made to the telephone instrument and the telephone case itself since the present device is adapted to mount and secure a conventional coin telephone and place in a conventional telephone booth. One of the advantages of the present arrangement is the fact that it may be applied universally to almost any type of existing coin telephone and the servicing and mounting does not require any alteration of the basic telephone equipment.

Member 12 is a wall bracket of a three dimensional, somewhat open box-like arrangement with a marginal edge 14 having cutouts 16 at selected locations on the periphery thereof to accommodate various projections of the telephone equipment. Member 12 is a wall mounting plate and is stamped or otherwise formed from very heavy steel plate to withstand substantial forces of attempted removal or pilferage. On the flat plate surface of member 12 there is formed four spaced mounting holes 18 which are tapped through the material in member 12 and which accommodate special mounting screws 20 having a double head with an enlarged outer portion 22 and a reduced body portion 24. Also formed in the material of member 12 are various openings 26 of different shapes, some of which expose screw holes in wall 50 and others accommodate the wires and conduits leading to the telephone itself and accommodate projections inherent in the telephone equipment. Attached to the outer periphery of the margin 14 of member 12 as by welding, riveting or otherwise are a pair of identical spaced, closed channel members 32 having closed bottom portions 34. As will appear again hereafter in further discussion bolts 20 may be pre-mounted in their respective tapped openings 18 and the entire member 12 complete with bolts 20 mounted from the front of the mounting plate 50 without removing same from the basic booth structure.

The box cover member 30 is open at the back and top and has a closed bottom portion 36 and a front plate 38 with a coin return opening 39 therein. The distance between the two side plates 42 of member 30 is slightly smaller than the distance between the inside faces of opposed marginal edges 14 of member 12 whereby the entire box-like member 30 will fit into the bottom portion of member 12 in the manner shown in FIG. 1 and other figures of the drawing.

The security device is completed in the present embodiment by a member 40 which comprises a front plate 44 having attached thereto spaced and opposed side plates 46 with inwardly turned marginal edges 48 and outwardly turned edges 52. On one of the spaced plates 46 there is formed a closed box-like structure 54 which is to cover and receive a conventional tubular lock structure having a keyhole exposed through an opening 56 in the front of box 54. The marginal edges 52 fit into the grooves formed in channels 32 of member 12. One of the channels 32 has an opening 58 formed therein through which there is inserted a lock bolt cap screw arrangement 60 readily engaging the opening 58 and having a coil spring 62 associated therewith to be affixed to one side of the lock whereby to unlock the device it is necessary to insert the key through the opening 56 and turn to disassemble the two locked portions.

The wall surface 50 which is in of itself a mounting or attaching plate and normally is attached permanently into the booth or other structure has pre-formed therein a plurality of openings to accommodate the various screws and other devices. Four keyhole openings 64 are formed at matching locations on plate 50 to correspond with the locations of the screws 20 in member 12. Since the enlarged portion of the keyhole opening 64 accommodates the enlarged head 22 of screw 20 it is possible to mount member 12 onto plate 50 from the front, that is, without it being necessary to remove plate 50 from the booth structure. Normally the wall or plate 50 is fabricated or fitted into the booth structure, or other coin telephone station in such a manner as to require extensive disassembly and alteration and removal of as many as upwards of 25 or 30 screws and similar fasteners before the plate could be removed from the booth. Therefore, the likelihood of thieves, pranksters, vandals or the like removing the entire apparatus including wall plate 50 is negligible since the job of removing wall 50 is so extensive.

Wall member or plate 50 also has pre-drilled therein and tapped a plurality of openings 66 located at preselected positions to align with corresponding openings 68 formed in the plate member 12 and both openings 66 and 68 are further to align with openings normally found in the conventional telephone equipment 70 in the back plate thereof (not shown) and which are conventionally used to attach a coin telephone in position in a booth. The screws (not shown) which are used to attach the telephone 70 to the plate 50 through holes 68 and into tapped openings 66 are conventional and normal parts of the telephone equipment and are readily used by removing the cover 72 which surrounds the telephone. There are a number of tapped openings 66 formed in plate 50 and all of them are not necessarily to be used in any one installation. Since there may be minor variations between particular telephone equipment it has been found expedient to locate and drill a number of tapped openings 66 thereby to accommodate practically any type of installation. Actually the location of openings 66 is a simple expedient of providing marked places in alignment with openings 68 which in turn correspond with the openings found in the particular telephone equipment 70 to be used.

The telephone equipment 70 has the usual telephone dial 74 and coin insertion slots 76. A conventional pivotal coin return receptacle 78 is provided in conventional manner on the telephone equipment 70 and this device 78 protrudes from the opening 39 found in cover 30 of the present apparatus.

In lieu of the particular cylindrical lock (not shown) to be used in connection with the lock arrangement 60 inside of the lock cover 54, if desired, a conventional padlock (not shown) may be placed in the opening 58 thereby locking the marginal edge 52 to the member 12 inside of and to the channel 32. Since in some instances cylindrical locks may be considered more tamperproof than padlocks, provision is made for the use of a cylindrical lock in this device.

There is provided in plate 50 a large opening 80 through which the conduits may be run to the telephone equipment 70 through the large, round opening 26 in member 12.

While I have shown and described a particular embodiment of my invention which employs three parts assembled into one unitary security device, it is apparent to one skilled in the art that portions may be eliminated and some or all of the part combined into lesser number or expanded into more parts and that other alterations, eliminations, substitutions, changes, deviations and variations may be made in the particular embodiment shown and described without departing from the scope of my invention as defined in the appended claims.

I claim:

1. In a telephone security device for mounting a conventional coin telephone in a telephone booth or other location whereat there is a rigid wall member or the like on which the telephone may be positioned:

(a) means for mounting a coin telephone on said wall, having a coin receptacle therein, (b) a closure device adapted to be removably positioned on said wall mounting means across the front of said telephone, (c) a lock means detachably locking said wall mounting means to lock said telephone in place, (d) said closure including a means covering at least a portion of the front of said telephone at said coin receptacle, (e) said means for mounting accommodating a conventional telephone and having means to accommodate the wires attached to said coin telephone, (f) whereby said mounting means may be mounted on said booth and said coin telephone attached in place thereon.

2. In a telephone security device for mounting a conventional coin telephone in a telephone booth or other location whereat there is a rigid wall member or the like on which the telephone may be positioned:

(a) means for mounting a coin telephone on said wall, (b) fastening means on said wall mounting means in "a" to retain said telephone thereon, (c) a closure device adapted to be removably attached to said wall mounting means across the front of said telephone, (d) a lock means having means detachably attaching said wall mounting means to said closure device, (e) said closure including a closure plate across the front of said telephone, (f) said means for mounting accommodating a conventional coin telephone and having means to accommodate the wires attached to said coin telephone, (g) whereby said mounting means may be mounted on said booth and said coin telephone attached in place thereon, and (h) said closure fitting about at least a portion of the front of the coin receptacle portion of said coin telephone.

3. In a telephone security device for mounting a conventional coin telephone in a telephone booth or other location whereat there is a rigid wall member on which the telephone may be positioned:

(a) a wall support member on which said conventional telephone may be mounted,
(b) fastening means for attaching said wall support member on said wall member,
(c) a security closure device adapted to be removably attached to said wall support member across the front of said telephone,
(d) a lock means having means detachably securing said wall support member in place,
(e) said wall support member accommodating a conventional coin telephone therein and having means to accommodate the wires attached to said coin telephone,
(f) whereby said support member may be mounted on said booth and said coin telephone locked in place on said support member, and
(g) said security closure fitting about the front of and enclosing the coin receptacle portion of said coin telephone.

4. In a telephone security device for mounting a conventional coin telephone in a telephone booth or other location whereat there is a rigid wall member on which the telephone may be positioned:

(a) said booth having a plurality of pre-formed openings therein adapted to receive fastening devices,
(b) a wall support member on which said conventional telephone may be mounted,
(c) fastening devices on said wall support member attachable in said pre-formed openings,
(d) a closure device adapted to be attached to said wall support member across the front of said telephone, including,
(e) a lock closure member having lock means openable to detach said closure device from said wall support member,
(f) said wall support member having pre-drilled and tapped openings therein to receive screws pre-mounted therein prior to assembly,
(g) said booth having pre-drilled openings therein into which are fitted the screws pre-mounted in said support member,
(h) said support member accommodating a conventional coin telephone therein and having openings to accommodate the wires attached to said coin telephone, and screw holes to accommodate screws therein,
(i) whereby said support member may be mounted on said booth from the front thereof and said coin telephone attached in place on said attaching plate, and
(j) said closure fitting about the front of and enclosing the coin receptacle portion of said coin telephone.

5. In a telephone security device for mounting a conventional coin telephone in a telephone booth or other location whereat there is a rigid wall member on which the telephone may be positioned:

(a) said booth location having means therein adapted to receive fastening means,
(b) a wall support member on which said conventional telephone may be mounted,
(c) fastening means on said wall support member attachable in said booth location means,
(d) a closure device adapted to be attached to said wall support member across the front of said telephone, including
(e) a lock closure member having means detachably attachable to said wall support member,
(f) said support member accommodating a conventional coin telephone therein and having openings to accommodate the wires attached to said coin telephone, and screw holes into which the telephone mounting screws may be screwed,
(g) whereby said wall support member may be mounted on said booth from the front thereof and said coin telephone attached in place,
(h) said closure fitting about the front of and enclosing the coin receptacle portion of said coin telephone.

6. In a telephone security device for mounting a conventional coin telephone in a telephone booth or other location whereat there is a rigid wall member on which the telephone may be positioned:

(a) said wall having a pre-formed mounting means therein,
(b) a mounting member having a substantially heavy wall mounting plate,
(c) a pair of opposed channels of heavy construction affixed to opposite sides of said mounting plate,
(d) a closure device having opposed side plates and a closed bottom,
(e) a coin return opening formed in the said last named device,
(f) a lock closure member detachably attachable to said mounting member,
(g) said mounting means accommodating a conventional coin telephone therein and having openings to accommodate the wires and attached to said coin telephone,
(h) whereby said mounting means may be mounted on said booth wall from the front thereof and said coin telephone attached in place on said mounting means,
(i) said closure fitting about the front of and enclosing the coin receptacle portion of said coin telephone, and
(j) said lock plate fitting over all of said last named plates and into said channel to lock same securely in place.

7. In a telephone security device for mounting a conventional coin telephone in a telephone booth or other location whereat there is a rigid wall member on which the telephone may be positioned:

(a) said wall having a pre-formed mounting means therein,
(b) a mounting member having a substantially heavy wall plate with an outwardly extending marginal edge thereon,
(c) a closure device having opposed side plates and a closed bottom and the distance between said side plates measured along said bottom being slightly less than the distance between the marginal edges of said mounting member whereby said device will fit therein,
(d) a coin return opening formed in the said last named device,
(e) a lock closure member detachably attachable to said mounting member,
(f) said mounting member accommodating a conventional coin telephone therein and having openings to accommodate the wires attached to said coin telephone,
(g) whereby said mounting means may be mounted on said booth wall from the front thereof and said coin telephone attached in place on said mounting means,
(h) said closure fitting about the front of and enclosing the coin receptacle portion of said coin telephone,
(i) and said lock plate fitting over all of said last named plates to lock same in place.

8. In a telephone security device for mounting a conventional coin telephone in a telephone booth or other location whereat there is a rigid wall member or the like on which the telephone may be positioned:

(a) said wall having a pre-formed mounting means therein,
(b) a mounting member having a substantially heavy wall plate with an outwardly extending marginal edge thereon, (c) a pair of opposed channels of heavy construction affixed to opposite sides of said mounting member, (d) a closure device having opposed side plates and a closed bottom and the distance between said side plates measured along said bottom being slightly less than the distance between the marginal edges of said attaching plate whereby said device will fit therein, (e) a coin return opening formed in the said last named device, (f) a lock closure member having edges detachably attachable in the channels of said mounting member, (g) said mounting member accommodating a conventional coin telephone therein and having openings to accommodate the wires and fastening means attached to said coin telephone.

(h) whereby said mounting means may be mounted on said booth wall from the front thereof and said coin telephone attached in place on said mounting means, (i) said closure fitting about the front of and enclosing the coin receptacle portion of said coin telephone, (j) and said lock plate fitting over all of said last named plates and into said channel to lock same securely in place.

9. In a telephone security device for mounting a conventional coin telephone in a telephone booth or other location whereat there is a rigid wall member on which the telephone may be positioned:

(a) said wall having a pre-formed opening therein, (b) a mounting member having a substantially heavy wall plate and having openings tapped therein, (c) screws having enlarged heads insertable in said preformed wall openings from the front, (d) a closure device attachable to said mounting member, (e) a coin return opening, (f) a lock closure member detachably attachable to lock said closure device to said mounting member, (g) said mounting member accommodating a conventional coin telephone therein and having tapped openings to which the telephone is attached and other openings to accommodate the wires and screws attached to said coin telephone, (h) said mounting means being mounted on said booth wall from the front thereof by said screws with enlarged heads and said coin telephone attached in place on said mounting means, whereby said mounting means covers said enlarged screws and said telephone covers the other tapped openings, (i) said closure fitting about the front of and enclosing the coin receptacle portion of said coin telephone, (j) and said lock locking said closure securely in place.

10. In a telephone security device for mounting a conventional coin telephone in a telephone booth or other station or location whereat there is a rigid wall member or the like on which the telephone may be positioned:

(a) said wall or the like having a plurality of preformed openings therein adapted to receive mounting screws, (b) a mounting plate being substantially of heavy plate, (c) a pair of opposed channels of heavy construction affixed to opposite sides of said mounting plate, (d) a closure device having opposed side plates and a closed bottom and being positionable on said mounting plate over said telephone, (e) a coin return opening formed in the said last named device, (f) a lock closure member having a pair of spaced plates with outwardly extending marginal edges thereon insertable in the channels of the said opposed channels on said attaching plate, (g) a closed lock box on said closure plate having a keyhole opening therein, (h) said mounting plate having pre-drilled and tapped openings therein to receive screws, (i) said wall of said booth having openings therein into which are fitted the screws from said mounting plate, (j) said mounting plate accommodating a conventional coin telephone therein and having openings to accommodate the wires attached to said coin telephone, (k) whereby said mounting plate may be mounted on said booth mounting plate from the front thereof and said coin telephone attached in place on said mounting plate, (l) said closure fitting about at least a portion of the front of and closing that portion of said coin receptacle, (m) and said lock plate fitting over all of said last named plates and into said channel to lock same securely in place.

11. In a telephone security device for mounting a conventional coin telephone in a telephone booth or other location whereat there is a rigid wall member on which the telephone may be fastened:

(a) a wall mounting means adapted to retain a coin telephone thereon, (b) retaining means to attach said mounting means on said wall, (c) a closure member detachable from said mounting means across the front of said telephone, (d) a lock closure member having means detachably attachable to said wall mounting means, (e) a closed lock box on said closure member having a keyhole opening therein, (f) said wall mounting means having pre-drilled and tapped openings therein to receive screws premounted therein prior to assembly, (g) said wall of said booth having means thereon by which said mounting plate is retained, (h) said mounting plate accommodating a conventional coin telephone therein and having openings to accommodate the wires attached to said coin telephone, (i) whereby said wall mounting plate may be mounted on said booth wall from the front thereof and said coin telephone attached in place on said attaching plate, (j) said closure fitting about the front of and enclosing the coin receptacle portion of said coin telephone, (k) and said lock box fitting on said device to lock said telephone securely in place.

References Cited by the Examiner

UNITED STATES PATENTS 2,716,882 9/55 Gill et al. ____________ 179—189

ROBERT H. ROSE, *Primary Examiner.*

WILLIAM C. COOPER, *Examiner.*